(12) United States Patent
Liu (10) Patent No.: US 11,038,702 B2
(45) Date of Patent: Jun. 15, 2021

(54) ACCESS CONTROL APPARATUS AND METHOD THEREFOR

(71) Applicant: LIFESAFETY POWER, INC., Libertyville, IL (US)

(72) Inventor: Guang Liu, Lake Zurich, IL (US)

(73) Assignee: LIFESAFETY POWER, Libertyville, IL (US)

(*) Notice: Subject to any disclaimer, the term of this patent is extended or adjusted under 35 U.S.C. 154(b) by 8 days.

(21) Appl. No.: 16/394,782

(22) Filed: Apr. 25, 2019

(65) Prior Publication Data

US 2020/0344079 A1 Oct. 29, 2020

(51) Int. Cl.
| | |
|---|---|
| *H04L 12/10* | (2006.01) |
| *G08B 25/06* | (2006.01) |
| *G07C 9/00* | (2020.01) |
| *G07C 9/27* | (2020.01) |

(52) U.S. Cl.
CPC .......... *H04L 12/10* (2013.01); *G07C 9/00896* (2013.01); *G07C 9/27* (2020.01); *G08B 25/06* (2013.01); *G07C 2009/00634* (2013.01)

(58) Field of Classification Search
CPC ....... H04L 12/10; G07C 9/27; G07C 9/00896; G07C 2009/00634; G08B 25/06
See application file for complete search history.

(56) References Cited

U.S. PATENT DOCUMENTS

| | | | |
|---|---|---|---|
| 9,397,842 B2 | 7/2016 | Sohnis et al. | |
| 2007/0075586 A1* | 4/2007 | Bogue | H04L 12/10 307/66 |
| 2008/0204220 A1* | 8/2008 | Baird | G08B 25/04 340/506 |
| 2013/0033106 A1* | 2/2013 | Schindler | H02J 2207/20 307/38 |
| 2013/0154348 A1* | 6/2013 | Hongo | G08C 17/00 307/1 |

* cited by examiner

*Primary Examiner* — Daniel Kessie
(74) *Attorney, Agent, or Firm* — Cygan Law Offices PC; Joseph T. Cygan (57) ABSTRACT

An apparatus includes an AC-to-DC power supply, with a positive terminal operatively coupled to two two-wire pairs of an Ethernet port to provide a first and second power path over a structured cable. A negative terminal is operatively coupled to a third two-wire pair of the Ethernet port to complete the first power path. Power path control logic has an input port operative to receive a two-wire input signal from an external device, and is operatively coupled to the negative terminal of the AC-to-DC power supply output, and to a fourth two-wire pair of the Ethernet port to complete the second power path. The power path control logic is operative to disconnect the negative terminal of the AC-to-DC power supply from the fourth two-wire pair of the Ethernet port in response to a two-wire input signal received at the input port, to disconnect the second power path.

8 Claims, 7 Drawing Sheets

ACCESS CONTROL APPARATUS AND METHOD THEREFOR

CROSS-REFERENCE TO RELATED APPLICATIONS

None.

FIELD OF THE DISCLOSURE

The present disclosure relates generally to building access control networks, and more particularly to door access control systems, apparatuses and methods using Internet Protocol (IP) access control and power over Ethernet (PoE).

BACKGROUND

Internet Protocol (IP) access control systems utilize access controllers installed near the doors that are being controlled. An example IP access control system may be connected to a central server via an Ethernet cable (for example CAT 3/5/5e/6 cables) for administrative functions. Power for the IP access control system can be transferred via the same Ethernet cable using Power over Ethernet (PoE) as defined by the IEEE 802.3 standards (for example, IEEE 802.3af), which eliminates the need to have a dedicated power supply at the door.

Most IP access control systems require connection to a Fire Alarm Control Panel (FACP) such that when a fire alarm is activated, the FACP will send out a signal to unlock certain doors (i.e. override any control signal that keeps the doors locked). This is usually implemented by connecting two copper wires from the FACP to each of the IP access controllers at the doors.

Figure 1:
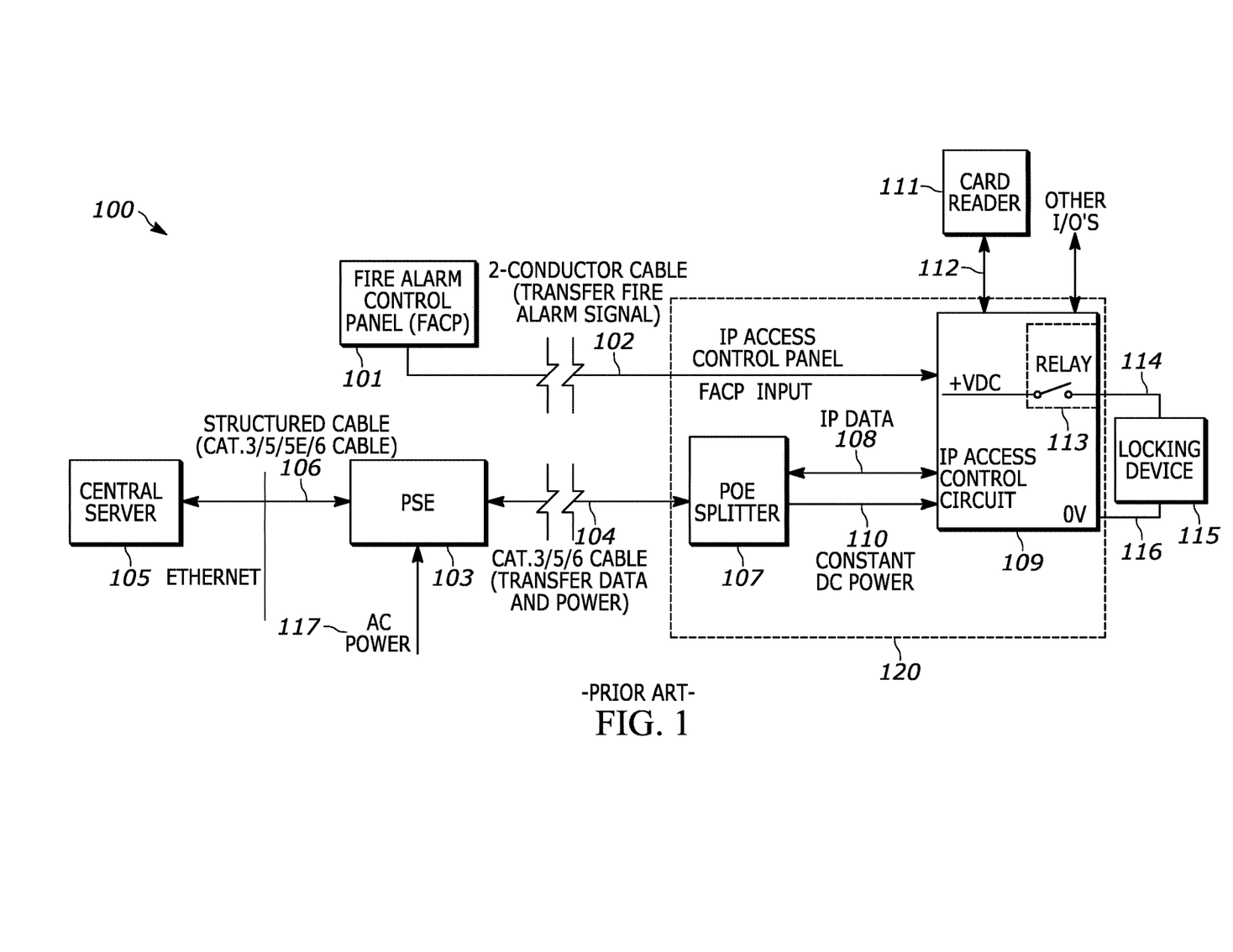
FIG. 1 is the block diagram of an example existing IP access control system having a two-conductor wire between a fire alarm control panel (FACP) and an IP access control panel.

FIG. 1 is the block diagram of an example existing IP access control system 100 having a two-conductor cable 102 between an FACP 101 and an IP access control panel 120. A central server 105 communicates with the IP access control panel 120 via an Ethernet connection over a structured cable 106. A PSE 103, which may be either a PoE midspan or a PoE switch (i.e. a PoE endspan), sends data and power through the Ethernet connection over structured cable 104 to the IP access control panel 120. The PSE 103 may receive AC power 117. A PoE splitter 107 passes the IP data 108 to the IP access control circuit 109, and also receives power from the PSE 103 and converts it to the proper voltage to supply a constant DC power 110 the IP access control panel 120 and accordingly to the IP access control circuit 109. In addition to the IP access control panel 120, the IP access control system 100 includes at least one card reader 111 or other type of credential input device, one electrical door locking device 115, and other devices. The card reader is connected to the IP access control circuit 109 by a connection 112 which may be any suitable cable such as a two-conductor cable, or an Ethernet cable. The two-conductor cable 102 connects the FACP 101 to the IP access control circuit 109 to provide a fire alarm override signal to override control of the locking device 115 and cause the corresponding door to be unlocked. The IP access control circuit 109 may include a relay 113 having one terminal connected to a positive DC voltage, and a second terminal connected to a first terminal 114 of the locking device 115. A second terminal 116 of the locking device 115 may be connected to a negative or zero voltage connection. The relay 113 is controlled by the IP access control circuit 109 and under normal operating conditions, controls the locking device 115 to open and close a door in accordance with preprogrammed instructions.

Figure 2:
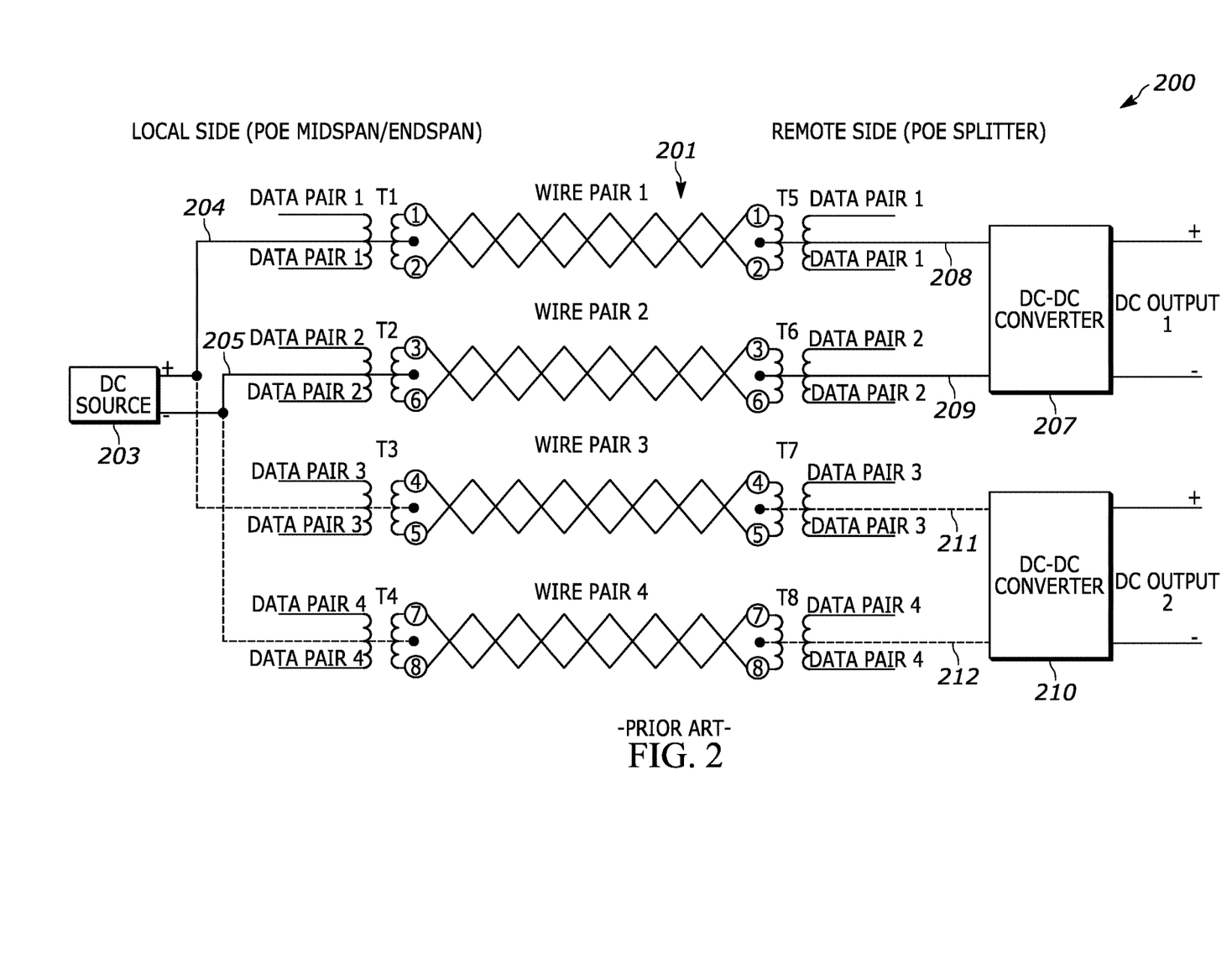
FIG. 2 is a diagram of example wiring details for an existing Power over Ethernet (PoE) system.

FIG. 2 provides an example of wiring details for an existing PoE system 200. In the example PoE system 200, a PoE PSE which may be a PoE midspan or PoE endspan, is located at the local side, and a PoE splitter is located at the remote side and coupled to the PoE PSE via a structured cable 201. The distance between the two sides can be up to 100 meters for an Ethernet system. The structured cable 201 may be, for example a CAT 3/5/5e/6 cable, etc. The structured cable 201 includes four twisted wire pairs, with an 8-pin Ethernet connector on each end. One data transformer may be connected at each end of a twisted wire pair, with up to four data transformers in the PSE midspan/endspan side (transformers T1-T4), and up to four data transformers in the splitter side (transformers T5-T8). IP signals travel from a transformer on the PSE midspan/endspan side through a twisted wire pair to a corresponding transformer on the PoE splitter side, in differential mode.

The IEEE 802.3af standard defines two modes of transmitting power over an Ethernet cable; "Mode A," and "Mode B." Mode A, or Endspan, defines supplying power from a power sourcing equipment (PSE) to a powered device (PD), as "phantom" power on top of 10/100 TX data on pins 1, 2, 3 and 6 of an Ethernet cable. Mode B, or Midspan, defines supplying power from a PSE to a PD on spare cable pairs (pins 4, 5, 7 and 8) while 10/100 Tx data is provided via pins 1, 2, 3, and 6. Thus in 10/100 Base-T full duplex Ethernet communication, IP signals travel through wire pair 1 and wire pair 2 providing two communication channels as in Mode B. However, in 1000 Base-T full duplex communication, IP signals travel through all the four wire pairs providing four communication channels. For power transfer, the more recent PoE standard, IEEE 802.3bt, uses both Mode A and Mode B to increase the total power that can be transferred over the structured cable.

Regarding PoE power coupling, power transfer is done through the same twisted wire pair in common mode so as not to interfere the IP data signals. FIG. 2 illustrates an example of such "phantom" power delivery over the same wire pairs transferring IP data. In the example PoE system 200, at the PSE, positive voltage terminal 204 of a DC power source 203 is connected to the center-tap of the secondary winding of a transformers T1 and T3. The negative voltage terminal 205 of the DC power source 203 is connected to the center-tap of the secondary of transformers T2 and T4. At the PoE splitter, the positive input 208 of a first DC-to-DC converter 207 is connected to the center-tap on the primary of transformer T5, and the negative input 209 of the DC-to-DC converter 207 is connected to the center-tap on the primary of transformer T6. The positive input 211 of a second DC-to-DC converter 210 is connected to the center-tap on the primary of transformer T7, and the negative input 212 of the DC-to-DC converter 210 is connected to the center-tap on the primary of transformer T8. Thus the DC-to-DC converter 207 provides DC Output 1 and the DC-to-DC converter 210 provides DC Output 2.

DETAILED DESCRIPTION

Briefly, the present disclosure provides an apparatus and system that enables execution of an FACP fire alarm override of door control without the need of copper wire cabling between the FACP and the IP access controller.

One disclosed embodiment provides an apparatus that includes an AC-to-DC power supply, having a positive terminal operatively coupled to two two-wire pairs of an Ethernet port to provide a first power path and a second power path over a structured cable, and a negative terminal operatively coupled to a third two-wire pair of the Ethernet port to complete the first power path. Power path control logic, that has an input port operative to receive a two-wire input signal from an external device, is operatively coupled to the negative terminal of the AC-to-DC power supply output, and to a fourth two-wire pair of the Ethernet port to complete the second power path. The power path control logic is operative to disconnect the negative terminal of the AC-to-DC power supply from the fourth two-wire pair of the Ethernet port in response to a two-wire input signal received at the input port, to disconnect the second power path.

In some embodiments of the apparatus, the power path control logic includes a controllable switch that is operative to disconnect the negative terminal of the AC-to-DC power supply from the fourth two-wire pair of the Ethernet port in response to a control signal, such that the second power path is disconnected. The controllable switch has an input to receive a control signal; a first switch terminal operatively coupled to the negative terminal of the AC-to-DC power supply output; and a second switch terminal operatively coupled to the fourth two-wire pair of the Ethernet port to complete the second power path.

In some embodiments of the apparatus, the power path control logic includes a control circuit, operatively coupled to the controllable switch to provide the control signal thereto, and operatively coupled to the input port. The control circuit is operative to receive the two-wire input signal from the external device, and to send the control signal to the controllable switch to disconnect the second power path in response to the two-wire input signal from the external device.

In some embodiments of the apparatus, the two-wire input signal from the external device is provided by the external device as an output type selected from the group consisting of: a normally-closed (NC) relay contact output, a normally-open (NO) relay contact output, and a continuous voltage (C) output. The two-wire input signal from the external device may be a fire alarm input (FAI) signal and the external device may be a Fire Alarm Control Panel (FACP).

One disclosed embodiment provides a system that includes the apparatus and also a power-over-Ethernet splitter that is operatively coupled to the apparatus by a structured cable. The splitter includes a splitter Ethernet port for connecting to the structured cable; a first DC-to-DC convertor, operatively coupled to two two-wire pairs of the splitter Ethernet port to receive power from the first power path over the structured cable; a second DC-to-DC convertor, operatively coupled to another two two-wire pairs of the Ethernet port to receive power from the second power path over the structured cable; an Internet protocol (IP) access control circuit, operatively coupled to the splitter to send IP data to, and receive IP data from, the apparatus, operatively coupled to the first DC-to-DC convertor to receive system power from the first power path, and operatively coupled to the second DC-to-DC convertor to receive lock power from the second power path used to maintain a locking device in a locked position. The IP access control circuit is operative to cause the locking device to be placed in an unlocked position in response to disconnection of the second power path by the apparatus.

Another disclosed embodiment provides an apparatus that includes an Ethernet port, with a first, second, third and fourth transformer, where each transformer corresponds to an Ethernet cable pin pair and is operative to provide a data connection to a remote power-over-Ethernet powered device via a structured cable. An AC-to-DC power supply is also present in the apparatus and has a positive terminal operatively coupled to a secondary center-tap of the first transformer and the third transformer, and a negative terminal operatively coupled to a secondary center-tap of the second transformer to provide a first power path using the first transformer and the second transformer. Power path control logic includes a first terminal operatively coupled to the negative terminal of the AC-to-DC power supply output; a second terminal operatively coupled to a secondary center-tap of the fourth transformer to provide a second power path using the third transformer and the fourth transformer; and an input port operative to receive a two-wire input signal from an external device. The power path control logic is operative to disconnect the negative terminal of the AC-to-DC power supply from the secondary center-tap of the fourth transformer, thereby disconnecting the second power path from the remote power-over-Ethernet powered device, in response to the two-wire input signal received at the input port.

In some embodiments of the apparatus, the power path control logic further includes a controllable switch that is operative to disconnect the negative terminal of the AC-to-DC power supply from the fourth two-wire pair of the Ethernet port in response to a control signal, to disconnect the second power path. The controllable switch includes a first switch terminal, where the first switch terminal is the power path control logic first terminal, that is operatively coupled to the negative terminal of the AC-to-DC power supply output; and a second switch terminal, where the second switch terminal is the power path control logic second terminal, that is operatively coupled to the secondary center-tap of the fourth transformer.

In some embodiments of the apparatus, the power path control logic further includes a control circuit that is operatively coupled to the controllable switch to provide the control signal thereto. The control circuit is operatively coupled to the input port, and is operative to receive the two-wire input signal from the external device. The control circuit sends the control signal to the controllable switch to disconnect the negative terminal of the AC-to-DC power supply from the secondary center-tap of the fourth transformer, thereby disconnecting a second power path to the powered device in response to the two-wire input signal from the external device.

The two-wire input signal from the external device may be provided by the external device as an output type selected from the group consisting of: a normally-closed (NC) relay contact output, a normally-open (NO) relay contact output, and a continuous voltage (C) output. The two-wire input signal from the external device may be a fire alarm input (FAI) signal and the external device may be a Fire Alarm Control Panel (FACP).

One disclosed embodiment provides a system that includes the apparatus and also a power-over-Ethernet splitter, operatively coupled to the apparatus by a structured cable. The splitter includes a splitter Ethernet port for connecting to the structured cable. The splitter Ethernet port includes a fifth, sixth, seventh and eighth transformer, with each transformer corresponding to an Ethernet cable pin pair that is operative to provide a data connection to the apparatus via the structured cable. A first DC-to-DC convertor, has a positive input operatively coupled to a primary center-tap of the fifth transformer, and a negative input operatively coupled to a primary center-tap of the sixth transformer, to receive power from the first power path over the structured cable. A second DC-to-DC convertor, has a positive input operatively coupled to a primary center-tap of the seventh transformer, and a negative input operatively coupled to a primary center-tap of the eight transformer, to receive power from the second power path over the structured cable. An Internet protocol (IP) access control circuit, is operatively coupled to the splitter to send IP data to, and receive IP data from, the apparatus. The IP access control circuit is operatively coupled to the first DC-to-DC convertor to receive system power from the first power path, and is operatively coupled to the second DC-to-DC convertor to receive lock power from the second power path. The IP access control circuit uses the second power path power to supply a locking device in a locked position so it can be controlled by the access control system under normal conditions (i.e. not an alarm condition). The IP access control circuit is operative to cause the locking device to be placed in an unlocked position in response to disconnection of the second power path by the apparatus. For example, when a control signal such as a fire alarm signal from an FACP is received at the apparatus, the apparatus will disconnect the second power path to the splitter.

The disclosed embodiments also provide a method of operation that includes: providing, by a power-over-Ethernet (PoE) power supply equipment apparatus (PSE), direct-current (DC) power to a PoE powered device over a first power path using two data wire pairs of a structured cable; providing, by the PoE PSE, DC power to a locking device over a second power path using another two data wire pairs of the structured cable, where the locking device is connected to the powered device and receives power therefrom; and disconnecting the second power path, by the PoE PSE in response to a control signal received by the PoE PSE.

The method step of disconnecting the second power path, by the PoE PSE in response to a control signal received by the PoE PSE, may include receiving a fire alarm input (FAI) from a fire alarm control panel (FACP) where the FAI is the control signal.

Another disclosed embodiment is an Internet Protocol (IP) access control system that includes a lock power injector and a lock power extractor. The lock power injector includes an AC-to-DC power supply that has a positive terminal operatively coupled to a first two-wire pair of an Ethernet port to provide a power path over a structured cable; and power path control logic with an input port operative to receive a two-wire input signal from an external device. The power path control logic is operatively coupled to a negative terminal of the AC-to-DC power supply output, and to a second two-wire pair of the Ethernet port to complete the power path. The power path control logic is operative to disconnect the negative terminal of the AC-to-DC power supply from the second two-wire pair of the Ethernet port in response to a two-wire input signal received at the input port, to disconnect the power path.

The lock power extractor is operatively coupled to the lock power injector by a structured cable. The lock power extractor includes a lock power extractor Ethernet port for connecting to the structured cable; and a DC-to-DC convertor, operatively coupled to two two-wire pairs of the lock power extractor Ethernet port to receive power from the power path over the structured cable.

In some embodiments of the IP access control system, the power path control logic includes a controllable switch that is operative to disconnect the negative terminal of the AC-to-DC power supply from the second two-wire pair of the Ethernet port in response to a control signal, to disconnect the power path. The controllable switch includes an input to receive a control signal; a first switch terminal operatively coupled to the negative terminal of the AC-to-DC power supply output; and a second switch terminal operatively coupled to the second two-wire pair of the Ethernet port to complete the power path.

In some embodiments, the power path control logic may further include a control circuit that is operatively coupled to the controllable switch to provide the control signal thereto. The control circuit is operatively coupled to the input port, and is operative to receive the two-wire input signal from the external device, and to send the control signal to the controllable switch to disconnect the power path in response to the two-wire input signal from the external device. The two-wire input signal from the external device may be a normally-closed (NC) relay contact output, a normally-open (NO) relay contact output, and a continuous voltage (C) output. The two-wire input signal may be a fire alarm input (FAI) signal and the external device may be a Fire Alarm Control Panel (FACP).

Another disclosed method of operation includes: providing, by a power-over-Ethernet (PoE) lock power injector, direct-current (DC) power to a PoE lock power extractor over a power path using two data wire pairs of a structured cable; providing, by a lock power extractor, DC power to a locking device connected to the lock power extractor; and disconnecting the power path, by the lock power injector in response to a control signal received by the lock power injector.

The method step of disconnecting the power path, by the lock power injector in response to a control signal received by the lock power injector, may include receiving a fire alarm input (FAI) from a fire alarm control panel (FACP) where the FAI is the control signal.

Figure 3:
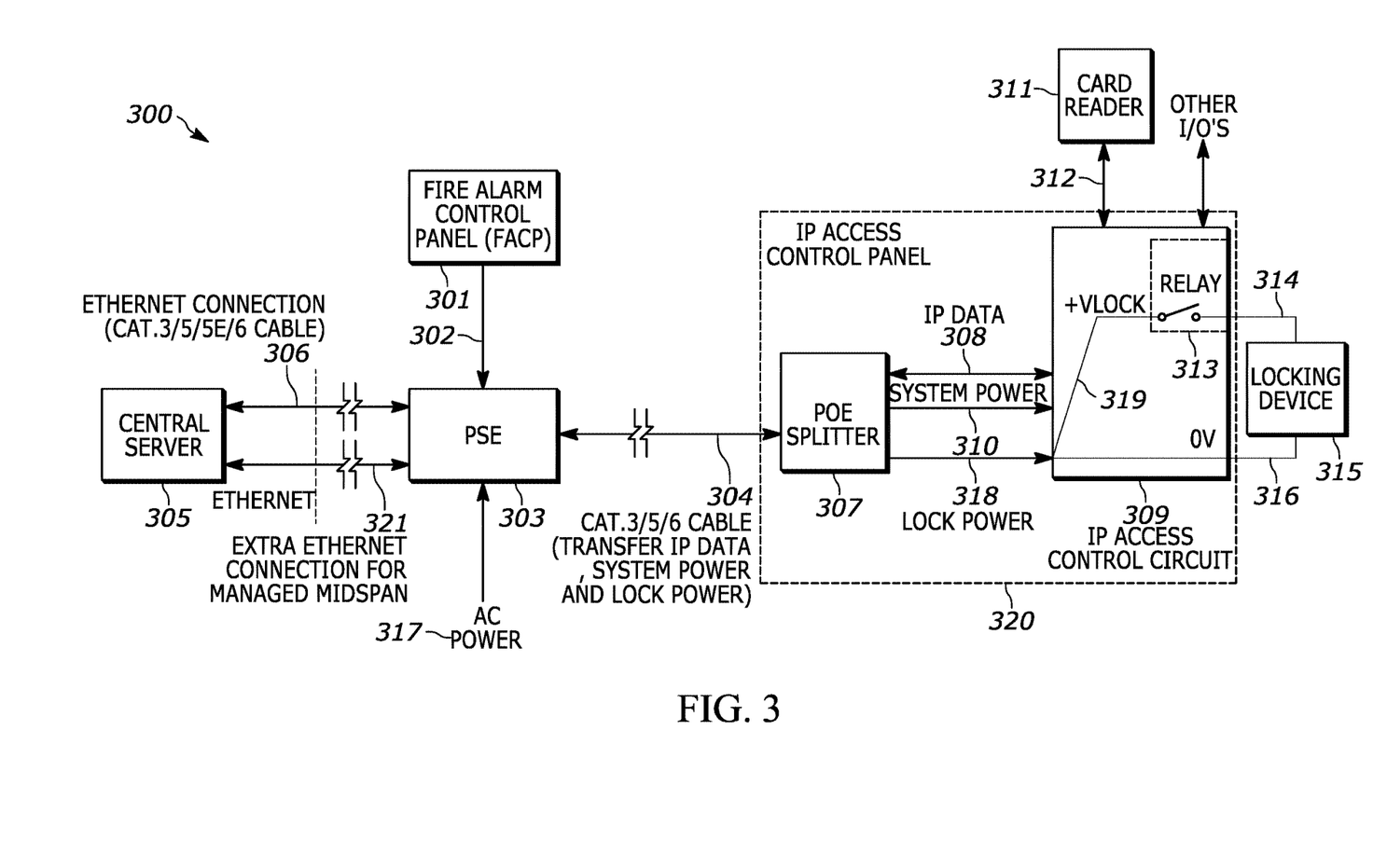
FIG. 3 is a block diagram of an example IP access control system in accordance with the embodiments.

Turning now to the drawings wherein like numerals represent like components, FIG. 3 is a block diagram of an IP access control system 300 in accordance with the embodiments. The IP access control system 300 includes a power sourcing equipment apparatus, PSE 303 which may be an endspan or midspan, a fire alarm control panel (FACP) 301 which is an external device, an IP access control panel 320, a credential receiving device such as card reader 311 and a locking device 315. The PSE 303 is a power-over-Ethernet (PoE) power sourcing equipment apparatus in accordance with the embodiments.

The PSE 303 is operatively coupled to the FACP 301 via a wire pair 302 to receive an FACP signal. The PSE 303 is operatively coupled to the IP access control panel 320 via a structured cable 304, and is operative to send and receive IP data and to transmit PoE power to the IP access control panel 320 over the structured cable 304. The PSE is operatively coupled to a central server 305 via a second structured cable 306 and a third structured cable 321 in embodiments in which the PSE 303 is a midspan apparatus. The structured cables 304, 306, 321 may each be any of a CAT 3, CAT 5 or CAT 6 cable, etc. The structured cable 306 provides IP data, control, and PoE power in some embodiments, from the central server 305 (or form an intermediary PSE) to the PSE 303 for transmission to the IP access control panel 320. The structured cable 321 is for PSE management functions between the PSE 303 and central server 305. The PSE 303 may also have an AC power connection 317.

The IP access control panel 320 includes an IP access control circuit 309 and a PoE splitter 307 which is operatively coupled to the IP access control circuit 309. The PoE splitter 307 is one type of a PoE powered device (PD). The IP access control circuit 309 is operatively coupled to the card reader 311 and to the locking device 315. The locking device 315 is another type of PoE PD. The PoE splitter 307 is operative to receive IP signals and PoE power from the PSE 303, and provide IP data 308, system power 310 and lock power 318 to the IP access control circuit 309. The system power 310 is a constant DC power provided to the IP access control panel 320 for any required purpose including, but not limited to, power for the IP access control circuit 309.

The lock power 318 output from the PoE splitter 307 is operatively coupled to the IP access control circuit 309. The IP access control circuit 309 may include a relay 313, or a power transistor, FET, or other circuitry and/or logic etc., to control the locking device 315 under normal operating conditions. The lock power 318 is operatively coupled to the IP access control circuit 309 such that an override of control is implemented under an alarm condition. For example, in embodiments having a relay 313, the lock power 318 positive voltage is connected to a first terminal 319 of the relay 313, and a second terminal of the relay 313 is connected to a first terminal 314 of the locking device 315. A second terminal 316 of the locking device 315 is connected to a negative or zero voltage connection of lock power 318. The relay 313 is controlled by the IP access control circuit 309 and under normal operating conditions, controls the locking device 315 to open and close a door in accordance with preprogrammed instructions. However, under an alarm condition, lock power 318 is removed which implements an override of control of the locking device 315 such that the associated door is opened accordingly.

In some embodiments the locking device 315 may be a fail-safe maglock (i.e. electromagnetic lock) such that the door is unlocked when lock power is removed. In other words, when the lock power 318 is present the relay 313 is fully controlled by the IP access control circuit 309 to lock or unlock the door based on preprogrammed rules. The card reader 311 is connected to the IP access control circuit 309 by a connection 312 which may be any suitable cable such as a two-conductor cable, or an Ethernet cable in some embodiments. In one example of normal operation (i.e. non-alarm conditions) an authorized person may swipe a card on the card reader 311 which, in conjunction with the IP access control circuit 309 and preprogrammed rules, will control the locking device 315 to open a door. Under an alarm condition, the removal of lock power 318 by the PSE 303 overrides normal operating control and opens the door.

Therefore, the PSE 303 provides two separate power paths over the structured cable 304 to the PoE splitter 307. A first power path is for the system power 310 which is a constant output for powering the IP access control panel 320, except for the locking device 315. A second power path over the structured cable 304 provides lock power 318 to power the locking device 315.

The second power path for lock power 318 is controlled by the FACP signal from the FACP 301. The FACP 301 is an external device, external from the PSE 303, and the FACP signal is a fire alarm signal and may be considered a control signal in accordance with the embodiments. During normal operation both the first and second power paths are coupled to the PoE splitter 307 thereby providing system power 310 and lock power 318 which maintains the door locked. Upon activation of a fire alarm, the PSE 303 in response to the fire alarm signal (i.e. a control signal from the FACP 301) cuts power to the second power path of the structured cable 304, thereby removing the lock power 318 output from the PoE splitter 307, causing the locking device 315 to unlock the door. Therefore, in the example embodiment illustrated in FIG. 3, the locking device 315 is fully controlled by the IP access control panel 320 under normal operating conditions. During a fire alarm condition, the PSE removes power to the locking device 315 by cutting the second power path over the structured cable 304, thereby overriding the IP access control panel 320 and unlocking the door.

Figure 4:
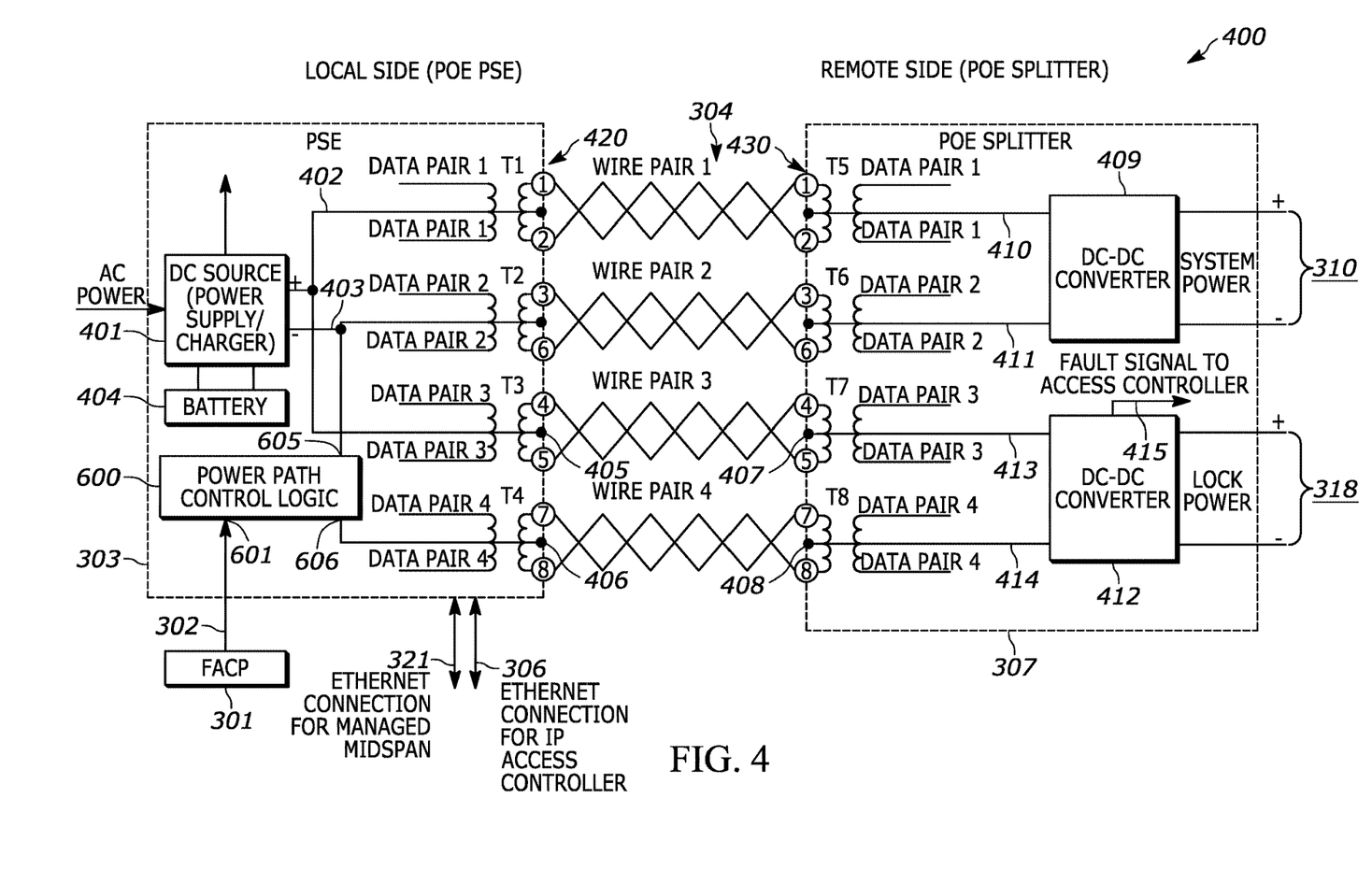
FIG. 4 is a diagram of example wiring details for PoE coupling in an IP access control system in accordance with the embodiments.

FIG. 4 is a diagram of example wiring details for PoE coupling in an IP access control system 400 in accordance with the embodiments and provides further details of an example PSE 303 and example PoE splitter 307. The PSE 303 includes a DC power source 401 (which may be an AC-to-DC power supply and battery charger), a battery 404 operatively coupled to the DC power source 401, an Ethernet port 420 operatively coupled to the DC power source 401, and power path control logic 600 operatively coupled to the DC power source 401 and to the Ethernet port 420.

The power path control logic 600 may be implemented in various ways in accordance with the embodiments. That is, the "logic" disclosed herein, in accordance with the embodiments, may be implemented using one or more programmable processors with software and/or firmware executing thereon, microcontrollers, ASICs, DSPs, hardwired logic, discrete circuit components, or combinations thereof. Additionally, in some embodiments, the power path control logic 600 may include integrated and/or external memory used to store various software and/or firmware modules, in accordance with the embodiments, where such modules include executable instructions for execution by one or more programmable processors.

The power path control logic 600 includes an input port 601 which is operative to receive a control signal input from an external device, such as a fire alarm input (FAI) from the FACP 301 over a wire pair 302. The FAI signal over the wire pair 302 may be provided from the FACP 301 as a relay output such as a normally-closed (NC) contact, normally-open (NO) contact, or a continuous voltage (C) type output, etc.

The PoE splitter includes a first DC-to-DC converter 409 which provides system power 310 as its output, and a second DC-to-DC converter 412 which provides lock power 318 as its output. The system power 310 and the lock power 318 may be different or may be the same in some embodiments. The PoE splitter 307 includes an Ethernet port 430 and is operatively coupled to the PSE 303 via a structured cable 304, having four wire pairs. The PSE 303 and the PoE splitter 307 each include at least one Ethernet physical layer (PHY) processor/chip and other processors and/or circuitry required to implement Ethernet connectivity. The PSE 303 and the PoE splitter 307 each has one or more Ethernet ports with each Ethernet port further including an Ethernet jack and magnetics including four Ethernet transformers with each transformer corresponding to an Ethernet cable pin pair. For example, PSE 303 includes Ethernet port 420 with transformers T1 through T4, and PoE splitter 307 includes Ethernet port 430 with transformers T5 through T8. In some embodiments, the transformers may be contained in an Ethernet transformer module such as discrete magnetics modules between the physical layer (PHY) chip and the connector jack, or in other embodiments may be contained in an integrated connector module (ICM). In embodiments using discrete magnetics, the discrete Ethernet transformer modules may be multiple channel modules. The PSE 303 will also have Ethernet ports for an Ethernet connection via structured cable 306 to a central server and an Ethernet connection via structured cable 321 for managed midspan in embodiments in which the PSE 303 is a midspan apparatus.

In the example IP access control system 400, at the PSE 303, positive voltage terminal 402 of the DC power source 401 is connected to the center-tap of the secondary winding of transformer T1 and to the center-tap 405 of the secondary winding of transformer T3. The negative terminal 403 of the DC power source 401 is connected to the center-tap of the secondary of transformer T2 and to a first terminal 605 of the power path control logic 600. A second terminal 606 of the power path control logic 600 is connected to the center-tap 406 of the secondary of transformer T4.

At the PoE splitter 307, the positive input 410 of the first DC-to-DC converter 409 is connected to the center-tap on the primary of transformer T5, and the negative input 411 of the DC-to-DC converter 409 is connected to the center-tap on the primary of transformer T6. The positive input 413 of the second DC-to-DC converter 412 is connected to the center-tap 407 on the primary of transformer T7, and the negative input 414 of the DC-to-DC converter 412 is connected to the center-tap 408 on the primary of transformer T8. Thus, the DC-to-DC converter 409 provides system power 310 and the DC-to-DC converter 412 provides lock power 318. Thus, under normal operating conditions, a first power path over the structured cable 304 over wire pair 1 and wire pair 2 provides system power 310, and a second power path over the structured cable 304 over wire pair 3 and wire pair 4 provides lock power 318. In the PSE 303, the power path control logic 600 is operative to receive an FACP signal received over the wire pair 302, and disconnect the second power path over wire pair 3 and wire pair 4 to remove lock power 318 in response to the FACP signal. In some embodiments, the power path control logic 600 may include a latching function to keep a fire alarm state active until a manual reset is performed, which is a safety requirement in some jurisdictions such as in the US and Canada.

In embodiments in which the PSE 303 is a midspan, the structured cable 321 provides an Ethernet connection for a power management function (managed midspan), and operatively couples the PSE 303 midspan to a network switch (not shown). In alternative embodiments, there can be two separate DC sources in the PSE 303; one DC source which has the proper power rating to power the IP access control panel 320 (i.e. system power 310), and the other having the proper power rating to power the locking device 315 (i.e lock power 318).

In addition to handling fire alarms by the PSE 303, if there is a fault condition in the DC power source 401, such as for example an abnormal output voltage, loss of AC input, or battery 404 disconnected, fault signals can be generated and sent to the PSE 303 controller which may be a central server. The PSE 303 is operative to generate and send an email alert with details of the fault occurrence to the manager of the system.

At the PoE splitter 307, a fault signal will be generated in the event that the DC-to-DC converter 412, which provides lock power 318, fails. A fault signal is sent to an event input of the IP access control circuit 309. In response to the fault signal, the IP access control circuit can send an alert message to a central server to request service.

Figure 5:
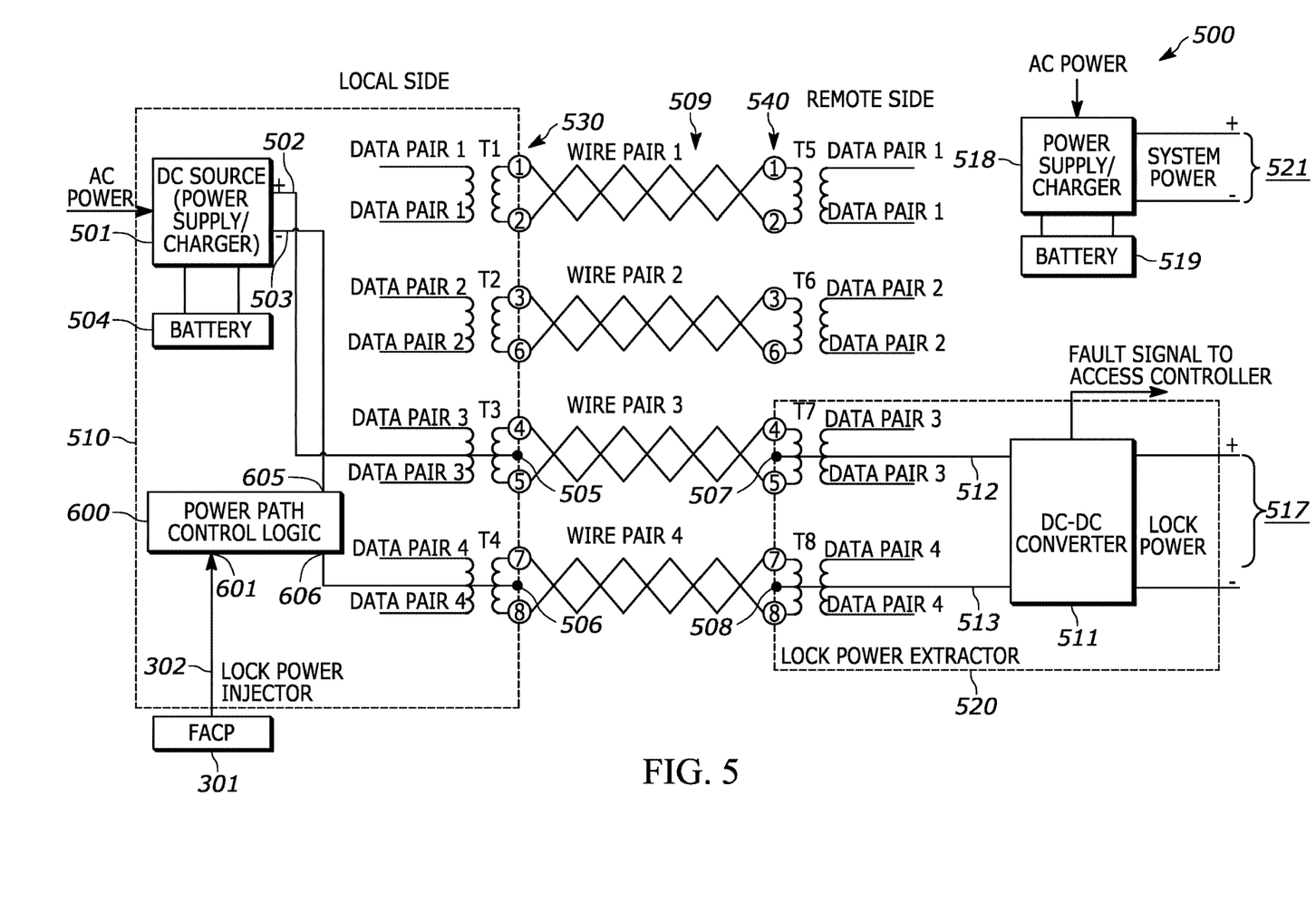
FIG. 5 is a diagram of example wiring details for PoE coupling in an IP access control system in accordance with other embodiments.

FIG. 5 is a diagram of example wiring details for PoE coupling in an IP access control system 500 in accordance with other embodiments. The example IP access control system 500, includes a separate lock power injector 510 (separate from a conventional PSE midspan/endspan) at the local side, and a lock power extractor 520 at the remote side.

The lock power injector 510 includes a DC power source 501 (which may be an AC-to-DC power supply and battery charger), a battery 504 operatively coupled to the DC power source 501, an Ethernet port 530 operatively coupled to the DC power source 501, and power path control logic 600 operatively coupled to the DC power source 501 and to the Ethernet port 530. The power path control logic 600 is also operatively coupled to an FACP 301 via a wire pair 302.

The lock power extractor 520 includes a DC-to-DC converter 511, operatively coupled to an Ethernet port 540. The DC-to-DC converter 511 provides lock power 517 as its output. A DC power source 518 on the remote side (which may be an AC-to-DC power supply and battery charger), and a battery 519 together provide system power 521. The lock power extractor 520 is operatively coupled to the lock power injector 510 via a structured cable 509 having four wire pairs, connected to the Ethernet port 540.

In the example IP access control system 500, at the lock power injector 510, positive voltage terminal 502 of the DC power source 501 is connected to the center-tap 505 of the secondary winding of a transformer T3. The negative terminal 503 of the DC power source 501 is connected to a first terminal 605 of the power path control logic 600. A second terminal of the power path control logic 600 is connected to the center-tap 506 of the secondary of transformer T4.

At the lock power extractor 520, the positive input 512 of the DC-to-DC converter 511 is connected to the center-tap 507 on the primary of transformer T7, and the negative input 513 of the DC-to-DC converter 511 is connected to the center-tap 508 on the primary of transformer T8. Thus, the DC-to-DC converter 511 provides lock power 517 and under normal operating conditions, a power path over the structured cable 509 over wire pair 3 and wire pair 4 provides lock power 517. The DC-to-DC converter 511 is also operative to generate a fault signal 515 for a failure condition. The fault signal 515 is to be sent to an alert input on an IP access control circuit (not shown). The IP access control circuit can then send a message to a central server to request service of the lock power extractor 520.

The lock power injector 510 operates in a manner similar to the PSE 303. That is, in the lock power injector 510, the power path control logic 600 is operative to receive an FACP signal received over the wire pair 302, and disconnect the power path over wire pair 3 and wire pair 4 to remove lock power 517 on the remote side in response to the FACP signal. In some embodiments, the power path control logic 600 may include the latching function to keep a fire alarm state active until a manual reset is performed, which is a safety requirement in some jurisdictions as discussed previously. During a fire alarm condition, the power path control logic 600 disconnects the DC power source 501 from the Ethernet port 530 in response to the control signal received from the FACP 301, thereby cutting the power path over the structured cable 509. Specifically, in the example of FIG. 5, the power path control logic 600 disconnects the DC power source 501 negative to transformer T4 and wire pair 4. This cuts lock power 517 at the lock power extractor 520 by removing the voltage inputs from transformers T7 and T8 to DC-to-DC converter 511. The power path control logic 600 disconnects the power path in response to a FACP signal received from the FACP 301 over the wire pair 302.

Figure 6:
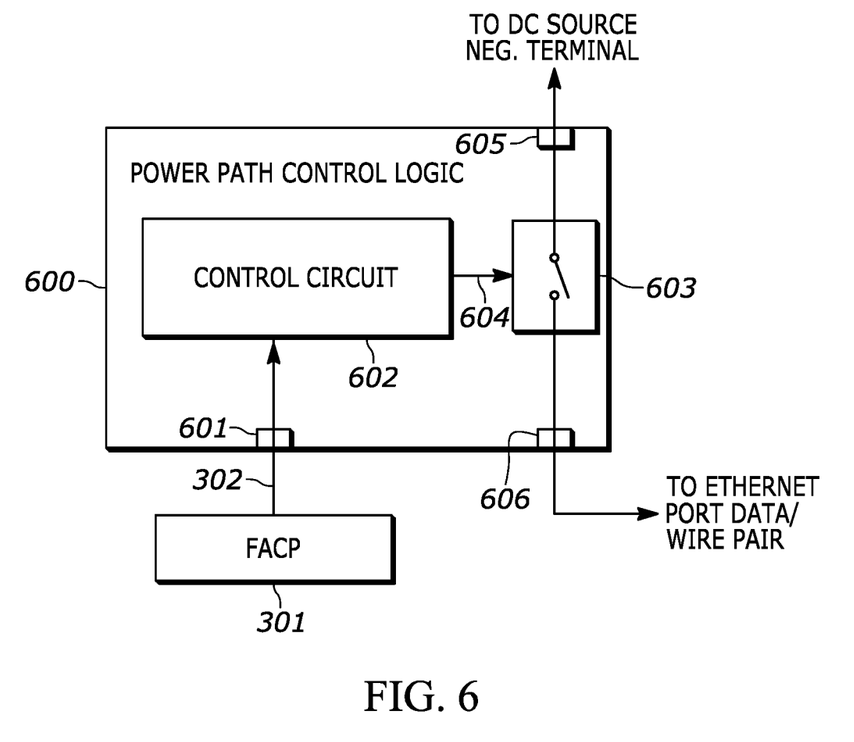
FIG. 6 is a block diagram of example power path control logic in accordance with the embodiments.

FIG. 6 is a block diagram of example power path control logic 600 in accordance with the embodiments. The power path control logic 600 includes a control circuit 602 operatively coupled to a controlled switch 603. As shown in the examples of FIG. 4 and FIG. 5, the power path control logic 600 is operatively coupled to an FACP 301 via a two-wire connection to an input port 601, which provides an input to the control circuit 602. A DC source negative terminal is connected to terminal 605 which is a first terminal of the controlled switch 603. The power path control logic 600 is operatively coupled to an Ethernet port data/wire pair by connecting a terminal 606 to the appropriate Ethernet port transformer tap. The terminal 606 is connected to a second terminal of the controlled switch 603.

During a fire alarm condition, the controlled switch 603 opens in response to the control signal 604 received from the control circuit 602, thereby cutting the appropriate power path over a structured cable. For example, in FIG. 4 the second power path over the structured cable 304 is removed by disconnecting the DC power source 401 negative to transformer T4 and wire pair 4. This cuts lock power 318 at the PoE splitter 307 by removing the voltage inputs from transformers T7 and T8 to DC-to-DC converter 412. The control circuit 602 sends the control signal 604 in response to a FACP signal received from the FACP 301 over the wire pair 302. In the various embodiments, the controlled switch 603 may be implemented using a relay, or a semiconductor device that can conduct and block electric current, such as a MOSFET.

During an initial handshaking process between the PSE 303 and the PoE splitter 307 on the IP access control panel 320 during setup, the controlled switch 603 is in a closed position at initial power up. After the handshaking process has successfully completed, the controlled switch 603 is operative to accept a control signal from the FACP 301.

Figure 7:
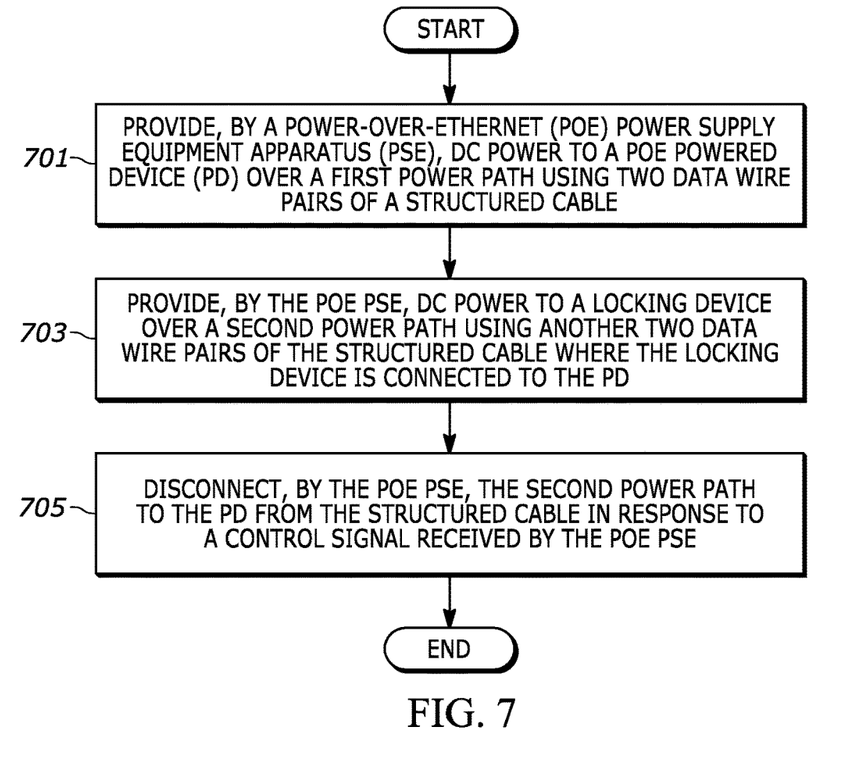
FIG. 7 is a flow chart showing operation of a power-over-Ethernet power supply equipment apparatus in an IP access control system in accordance with the embodiments.

FIG. 7 is a flow chart showing operation of a power-over-Ethernet power supply equipment apparatus such as PSE 303 in the IP access control system 400 in accordance with the embodiments. The method of operation begins and in operation block 701, a power-over-ethernet (PoE) power supply equipment (PSE) apparatus provides DC power to a PoE powered device (PD) over a first power path using two data wire pairs of a structured cable. For example, the PSE 303 provides DC power to the PoE splitter 307 over a first power path of structured cable 304 using data wire pair 1 and data wire pair 2.

In operation block 703, PoE PSE provides DC power to a locking device over a second power path using another two data wire pairs of the structured cable where the locking device is connected to the PD. For example, the PSE 303 provides DC power to the PoE splitter 307 over a second power path of structured cable 304 using data wire pair 3 and data wire pair 4. In operation block 705, the PSE disconnects the second power path to the PD from the structured cable in response to a control signal received by the PoE PSE. For example, the PSE 303 disconnects the second power path to the PoE splitter 307 over the structured cable 304 in response to an FAI signal received from the FACP 301 over the wire pair 302. The method of operation then terminates.

Figure 8:
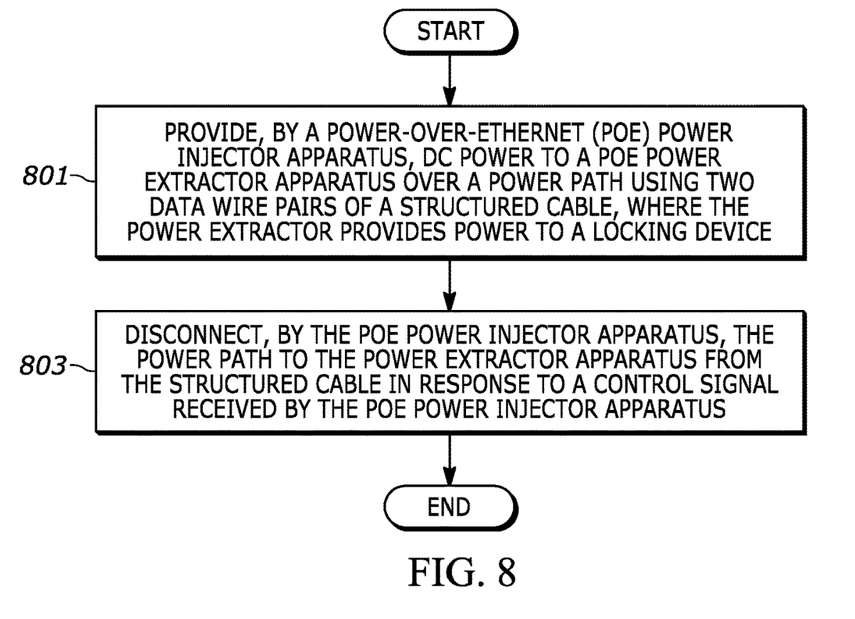
FIG. 8 is a flow chart showing operation of a power-over-Ethernet lock power injector apparatus in an IP access control system in accordance with the embodiments.

FIG. 8 is a flow chart showing operation of a power-over-Ethernet lock power injector apparatus such as lock power injector apparatus 510 in the IP access control system 500 in accordance with the embodiments. In operation block 801, a PoE power injector apparatus provides DC power to a PoE power extractor apparatus over a power path using two data wire pairs of a structured cable, where the power extractor provides power to a locking device. In operation block 803, the PoE power injector apparatus disconnects the power path to the power extractor apparatus from the structured cable in response to a control signal received by the PoE power injector apparatus. For example, the lock power injector 510 removes power to the power path to the lock power extractor 520 over the structured cable 509 in response to an FAI signal received from the FACP 301 over the wire pair 302. The method of operation then terminates.

While various embodiments have been illustrated and described, it is to be understood that the invention is not so limited. Numerous modifications, changes, variations, substitutions and equivalents will occur to those skilled in the art without departing from the scope of the present invention as defined by the appended claims.

What is claimed is:

1. An apparatus comprising:
an AC-to-DC power supply, having a positive terminal operatively coupled to two two-wire pairs of an Ethernet port to provide a first power path and a second power path over a structured cable, and a negative terminal operatively coupled to a third two-wire pair of the Ethernet port to complete the first power path; and
power path control logic, comprising:
a control circuit;
an input port, operatively coupled to the control circuit, operative to receive a two-wire input signal from an external device and provide the two-wire input signal to the control circuit; and
a controllable switch, operatively coupled to the control circuit, the controllable switch operative to disconnect the negative terminal of the AC-to-DC power supply from a fourth two-wire pair of the Ethernet port in response to a control signal from the control circuit, to disconnect the second power path, the controllable switch comprising:
an input to receive the control signal from the control circuit;
a first switch terminal operatively coupled to the negative terminal of the AC-to-DC power supply output; and
a second switch terminal operatively coupled to the fourth two-wire pair of the Ethernet port to complete the second power path.

2. The apparatus of claim 1, where the two-wire input signal from the external device is provided by the external device as an output type selected from the group consisting of: a normally-closed (NC) relay contact output, a normally-open (NO) relay contact output, and a continuous voltage (C) output.

3. The apparatus of claim 1, where the two-wire input signal from the external device is a fire alarm input (FAI) signal and the external device is a Fire Alarm Control Panel (FACP).

4. A system comprising:
an AC-to-DC power supply, having a positive terminal operatively coupled to two two-wire pairs of an Ethernet port to provide a first power path and a second power path over a structured cable, and a negative terminal operatively coupled to a third two-wire pair of the Ethernet port to complete the first power path; and
power path control logic, comprising an input port operative to receive a two-wire input signal from an external device, the power path control logic operatively coupled to the negative terminal of the AC-to-DC power supply output, and to a fourth two-wire pair of the Ethernet port to complete the second power path, the power path control logic operative to disconnect the negative terminal of the AC-to-DC power supply from the fourth two-wire pair of the Ethernet port in response to a two-wire input signal received at the input port, to disconnect the second power path;
a power-over-Ethernet splitter, operatively coupled to the apparatus by a structured cable, the splitter comprising:
a splitter Ethernet port for connecting to the structured cable;
a first DC-to-DC convertor, operatively coupled to two two-wire pairs of the splitter Ethernet port to receive power from the first power path over the structured cable;
a second DC-to-DC convertor, operatively coupled to another two two-wire pairs of the Ethernet port to receive power from the second power path over the structured cable;
an Internet protocol (IP) access control circuit, operatively coupled to the splitter to send IP data to, and receive IP data from, the apparatus, operatively coupled to the first DC-to-DC convertor to receive system power from the first power path, and operatively coupled to the second DC-to-DC convertor to receive lock power from the second power path used to maintain a locking device in a locked position, the IP access control circuit operative to cause the locking device to be placed in an unlocked position in response to disconnection of the second power path by the apparatus.

5. An apparatus comprising:
an Ethernet port, comprising a first, second, third and fourth transformer, each transformer corresponding to an Ethernet cable pin pair and operative to provide a data connection to a remote power-over-Ethernet powered device via a structured cable;
an AC-to-DC power supply, having a positive terminal operatively coupled to a secondary center-tap of the first transformer and the third transformer, and a negative terminal operatively coupled to a secondary center-tap of the second transformer to provide a first power path using the first transformer and the second transformer; and
power path control logic, comprising:
a control circuit;
an input port, operatively coupled to the control circuit, operative to receive a two-wire input signal from an external device and provide the two-wire input signal to the control circuit; and
a controllable switch, operatively coupled to the control circuit and operative to disconnect the negative terminal of the AC-to-DC power supply from the fourth two-wire pair of the Ethernet port in response to a control signal from the control circuit, the controllable switch comprising:
a first switch terminal and a second switch terminal, where the first switch terminal is the power path control logic first terminal and is operatively coupled to the negative terminal of the AC-to-DC power supply output;
a second switch terminal, where the second switch terminal is the power path control logic second terminal and is operatively coupled to a secondary center-tap of the fourth transformer to provide a second power path using the third transformer and the fourth transformer.

6. The apparatus of claim 5, where the two-wire input signal from the external device is provided by the external device as an output type selected from the group consisting of: a normally-closed (NC) relay contact output, a normally-open (NO) relay contact output, and a continuous voltage (C) output.

7. The apparatus of claim 5, where the two-wire input signal from the external device is a fire alarm input (FAI) signal and the external device is a Fire Alarm Control Panel (FACP).

8. A system comprising:
an Ethernet port, comprising a first, second, third and fourth transformer, each transformer corresponding to an Ethernet cable pin pair and operative to provide a data connection to a remote power-over-Ethernet powered device via a structured cable;
an AC-to-DC power supply, having a positive terminal operatively coupled to a secondary center-tap of the first transformer and the third transformer, and a negative terminal operatively coupled to a secondary center-tap of the second transformer to provide a first power path using the first transformer and the second transformer; and
power path control logic, comprising:
a first terminal operatively coupled to the negative terminal of the AC-to-DC power supply output;
a second terminal operatively coupled to a secondary center-tap of the fourth transformer to provide a second power path using the third transformer and the fourth transformer; and
an input port operative to receive a two-wire input signal from an external device, where the power path control logic is operative to disconnect the negative terminal of the AC-to-DC power supply from the secondary center-tap of the fourth transformer, thereby disconnecting the second power path from the remote power-over-Ethernet powered device, in response to the two-wire input signal received at the input port;
a power-over-Ethernet splitter, operatively coupled to the apparatus by a structured cable, the splitter comprising:
a splitter Ethernet port for connecting to the structured cable, the splitter Ethernet port comprising a fifth, sixth, seventh and eighth transformer, each transformer corresponding to an Ethernet cable pin pair and operative to provide a data connection to the apparatus via the structured cable;
a first DC-to-DC convertor, having a positive input operatively coupled to a primary center-tap of the fifth transformer, and a negative input operatively coupled to a primary center-tap of the sixth transformer, to receive power from the first power path over the structured cable;

a second DC-to-DC convertor, having a positive input operatively coupled to a primary center-tap of the seventh transformer, and a negative input operatively coupled to a primary center-tap of the eight transformer, to receive power from the second power path over the structured cable; and an Internet protocol (IP) access control circuit, operatively coupled to the splitter to send IP data to, and receive IP data from, the apparatus, operatively coupled to the first DC-to-DC convertor to receive system power from the first power path, and operatively coupled to the second DC-to-DC convertor to receive lock power from the second power path used to maintain a locking device in a locked position, the IP access control circuit operative to cause the locking device to be placed in an unlocked position in response to disconnection of the second power path by the apparatus.

\* \* \* \* \*